Aug. 7, 1928.
H. A. SIMPSON
HANGER ROD
Filed Oct. 5, 1925
1,679,881
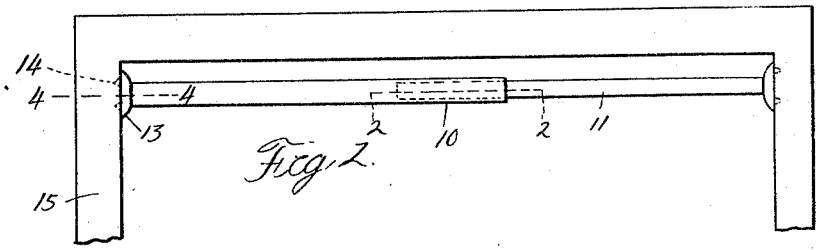
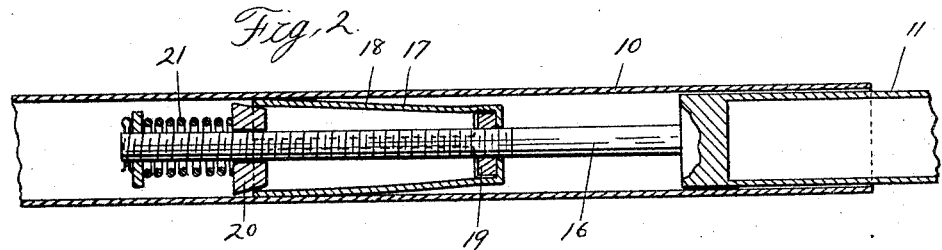
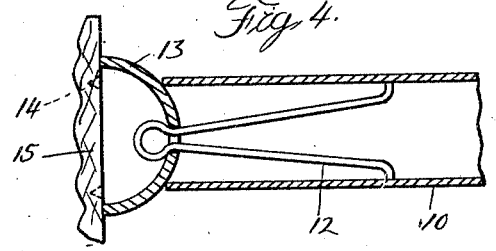
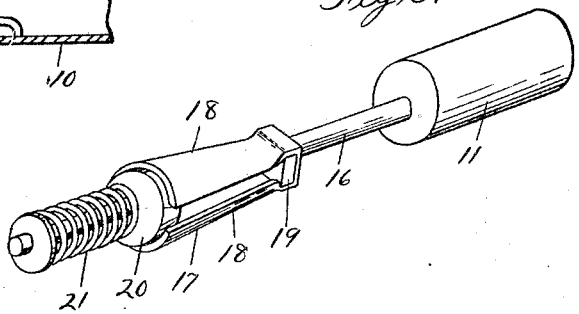
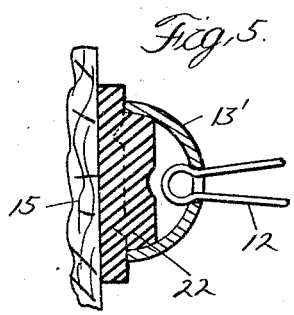
Inventor
Herbert A. Simpson Patented Aug. 7, 1928.

1,679,881

UNITED STATES PATENT OFFICE.

HERBERT A. SIMPSON, OF EAST LANSING, MICHIGAN.

HANGER ROD.

Application filed October 5, 1925. Serial No. 60,582.

The invention relates to hanger rods and has among its objects to provide a simply constructed hanger rod or curtain pole which may be readily attached in doorways, window frames, etc., without requiring the use of wall supporting brackets or other attaching devices which have to be fastened to the supporting structure.

With these and other objects in view, the invention resides in the novel features of construction and combination and arrangements of parts as more fully hereinafter described and claimed.

Referring to the drawings in which like reference characters indicate corresponding parts, Figure 1 is a fragmentary elevation view of a doorway or window frame showing attached thereto my hanger rod;

Figure 2 is a sectional view along 2—2 of Figure 1;

Figure 3 is a perspective view of the friction locking element or expansible clutch;

Figure 4 is a detail sectional view along 4—4 of Figure 1; and

Figure 5 illustrates a modified construction of an end fixture.

The rod comprises the telescoping or overlapping sections 10 and 11, these sections being open at their outer ends and engageable through a spring connecting member 12 with the end fixtures 13. The resilience of the spring members 12 adapts them to frictionally engage the inner walls of the sections 10 and 11 to hold the end fixtures in position and at the same time permit rotation of the telescoping sections with respect to the end fixtures. These fixtures may be further provided with prongs 14 adapted to be forced into the supporting structure 15 which may be a doorway arch, window frame or the like.

One of the sections as the section 11, is provided with a threaded member or screw rod 16 upon which is mounted the friction locking element or expansible clutch 17. This clutch as shown in Figure 3 is formed of the wings or expanding portions 18 constructed at one end to receive a nut 19 threadedly engageable with the rod 16. The other end of the clutch 17 is adapted to frictionally engage the inner wall of the section 10 and for maintaining a frictional engagement of the wings 18 with the section 10 I have provided a tapered expanding element 20 slidably engageable with the rod 16 and urged longitudinally of the rod to expand the wings 18 by reason of a spring 21.

In the unlocked position of the parts, the wings 18 of the clutch 17 slidably and frictionally engage the walls of the section 10, the friction established by the spring 21 acting on the tapered expanding element 20 being insufficient to prevent relative longitudinal movement of the sections 10 and 11, but being sufficiently great so that when one of the telescoping sections is rotated with respect to the other the wings 18 will be held fixed with the section 10. Thus when it is desired to position the hanger rod for use the sections 10 and 11 are longitudinally separated approximately to their final positions with the end fixtures 13 engaging the sides of the arch or window frame 15. Then one of the sections, as the section 11, is rotated with respect to the section 10 and because of the friction between the wings 18 and section 10 the clutch 17 will not rotate with the section 11 and rod 16, but through the nut 19 engaging the rod 16 will be caused to travel longitudinally of the rod 16 to the left as shown in Figure 2. This movement of the clutch causes the ends of the wings 18 to be firmly wedged between the expanding element 20 and the inner wall of the section 10 whereupon further rotation of the section 11 will cause the sections 10 and 11 to be relatively outwardly moved. During this outward movement of the telescopic sections, the clutch 17 is firmly clamped against rotation or longitudinal movement by the expanding element 20 acting to expand the wings 18 against the section 10. As the sections are moved outwardly the spring 21 will be compressed so as to still further increase the clamping effect of the element 20. The limit of travel of the section 11 with respect to the section 10 is determined by the amount of compression the spring 21 can take. In this manner the the telescopic sections are forced outwardly from each other causing the projections 14 of the fixtures 13 to bite into the walls 15. In removing the hanger rod it is merely necessary to relatively rotate the sections 10 and 11 in the opposite direction whereby the parts will be restored to their unlocked positions permitting free longitudinal movement of the sections 10 and 11.

The spherically shaped fixtures 13 being engaged by the open ends of the rods 10 and 11, it will be apparent that a universal movement is afforded at the ends of the rods. Thus, the rod will automatically adjust itself to uneven surfaces such as slanting walls or window jambs and will also provide an increased outer thrust to these sections by a wedge like action as the rod is loaded since the rods have a tendency to slip down over the spherical fixtures. Thus the gripping increases with the load applied.

Referring to Figure 5 I have provided a modified construction in which the fixtures 13' are fitted with an insert of a rubber-like substance 22 for frictionally engaging the wall 15 where it would be undesirable to mar the wall as by penetration of the projections 14 in the form illustrated in Figure 4.

It will be noted that I have provided a simply constructed hanger rod which may be quickly attached to opposite supporting surfaces without requiring the use of supporting brackets fixed with these supporting surfaces.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. A hanger rod comprising a pair of telescopically arranged relatively slidable and rotatable sections engageable at their outer ends with a supporting surface, locking means carried by one of said sections and frictionally engaging the other permitting relative sliding of the sections when unlocked, said sections being locked against relative sliding by said locking means upon rotating one of said sections with respect to the other, and means effective upon continued relative rotation for positively feeding one section longitudinally of the other.

2. A hanger rod comprising a pair of telescoped sections, a threaded member fixed to one of said sections, an element frictionally engageable with the second section and normally longitudinally movable with the first section, and means effective upon a relative rotative movement of said sections at various positions of their longitudinal adjustment for clutching the friction element with the second section whereby upon continued relative rotation of the sections the threaded member will act to positively and relatively longitudinally move the sections.

3. A hanger rod comprising a pair of telescoped sections, a threaded member fixed to one of said sections, an element frictionally engageable with the second section and normally longitudinally movable with the first section, an element threaded for engagement with the said threaded member and connected to move the said friction element, and means including an expanding element effective upon a relative rotative movement of said sections at various positions of their longitudinal adjustment for causing the expanding element to move the friction element into locking engagement with the second section, continued relative rotation of the sections thereafter causing travel of the threaded element with respect to the threaded member and first section to positively and relatively longitudinally move the sections.

4. A hanger rod comprising a pair of telescoped sections, a threaded member fixed to one of said sections, an element frictionally engageable with the second section and normally longitudinally movable with the first section, a nut threadedly engaging said threaded member and connected to move the said friction element slidably, an expanding element carried by the first said member and engageable with the friction element, and a spring urging said expanding element toward said friction element.

5. A hanger rod comprising a pair of overlapping sections, one of said sections being open ended, a substantially hemispherical end fixture provided with prongs engageable in a supporting surface, means connecting the end fixture within the said open end of one of the sections, and means for positively longitudinally separating the sections to force the said prongs into the said supporting surface, and to seat the open end of said section upon a portion of the spherical surface of said fixture.

6. A hanger rod comprising a pair of overlapping sections, one of said sections being open ended, a substantially hemispherical end fixture provided with prongs engageable in a supporting surface, means connecting the end fixture within the said open end of one of the sections, said connection permitting relative rotation between the end fixture and the last said section, and means for positively longitudinally separating the sections to force the said prongs into the said supporting surface, and to securely seat the open end of said section upon a portion of the spherical surface of said fixture.

7. A hanger rod for attachment to a supporting surface comprising a pair of overlapping sections, a substantially hemispherical end fixture carried by one of said sections, means establishing a connection between the fixture and the supporting surface, said means preventing rotation of the fixture with respect to the said surface, and means for positively longitudinally separating the sections.

8. A hanger rod comprising a pair of overlapping sections, one of said sections being open ended, an end fixture having a spherically shaped portion slidably engageable with the open end of said rod, said fixture provided with prongs engageable in a supporting surface, and means for positively longitudinally separating the sections to force the said prongs into the said supporting surface.

9. A hanger rod comprising a pair of overlapping sections, one of said sections being open ended, an end fixture having a spherically shaped portion slidably engageable with the open end of said rod, said fixture provided with prongs engageable in a supporting surface, means connecting the end fixture within the said open end of one section, and means for positively longitudinally separating the sections to force the said prongs into the said supporting surface.

10. A hanger rod comprising a pair of relatively slidable and rotatable telescopic sections, a locking device controlled by relative rotation of the sections and including an expansible element rotatable with respect to one section and longitudinally slidable with respect to the other, and a member slidably mounted upon one of said sections and engageable with said expansible element for expanding the same.

11. In combination with a pair of relatively slidable and rotatable telescopic sections, a locking device controlled by relative rotation of the sections and including an expansible element rotatable with respect to one section and longitudinally slidable with respect to the other, and a tapered expanding element slidably mounted upon a rod carried by one of said sections and engageable with the expansible element for expanding the same.

12. A hanger rod comprising a pair of telescopically arranged relatively longitudinal slidable sections, and means effective upon a relative rotative movement of the sections at various positions of their longitudinal adjustment for locking one section with respect to the other whereby upon continued relative rotation of the sections the same will be positively and relatively longitudinally moved to bring the opposite ends thereof into engagement with spaced supporting surfaces.

In testimony whereof I affix my signature.

HERBERT A. SIMPSON.